US 8,594,496 B2

(12) United States Patent
Effenberger

(10) Patent No.: US 8,594,496 B2
(45) Date of Patent: Nov. 26, 2013

(54) TUNABLE COHERENT OPTICAL TIME DIVISION REFLECTOMETRY

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 740 days.

(21) Appl. No.: 12/618,440

(22) Filed: Nov. 13, 2009

(65) Prior Publication Data

US 2011/0116799 A1    May 19, 2011

(51) Int. Cl.
*H04B 10/08* (2011.01)
(52) U.S. Cl.
USPC .......... 398/16; 398/20; 398/21; 398/33; 398/34; 398/31; 398/25; 398/10; 398/13; 398/17; 356/73.1; 250/227.18; 250/227.16; 250/227.15; 385/24; 385/12; 385/14
(58) Field of Classification Search
USPC .......... 398/33, 34, 38, 25, 16, 31, 10, 13, 17, 398/22, 9, 135, 139, 20, 21, 72, 79, 28, 30, 398/14; 356/73.1; 250/227.18, 227.16, 250/227.15; 385/24, 12, 14, 15, 38, 39, 48, 385/123
See application file for complete search history.

(56) References Cited

U.S. PATENT DOCUMENTS

| 5,062,703 | A * | 11/1991 | Wong et al. ............ 356/73.1 |
| 6,606,148 | B2 * | 8/2003 | Fredin et al. ........... 356/73.1 |
| 6,771,358 | B1 | 8/2004 | Shigehara et al. |
| 8,050,556 | B2 | 11/2011 | Effenberger |
| 8,180,216 | B2 * | 5/2012 | Xia et al. .............. 398/25 |
| 8,502,964 | B2 | 8/2013 | Wang et al. |
| 2006/0110161 | A1 | 5/2006 | Cho et al. |
| 2006/0159464 | A1 | 7/2006 | Cornwell et al. |
| 2009/0263122 | A1 | 10/2009 | Helkey et al. |
| 2010/0135653 | A1 | 6/2010 | Lee et al. |
| 2013/0039645 | A1 * | 2/2013 | Effenberger ............ 398/14 |

FOREIGN PATENT DOCUMENTS

| CN | 101304283 A | 11/2008 |
| EP | 1884758 A1 | 2/2008 |
| JP | 2009080050 A | 4/2009 |

OTHER PUBLICATIONS

Foreign Communication From a Related Counterpart Application, PCT Application PCT/CN2010/077909, International Search Report dated Jan. 27, 2011, 4 pages.

(Continued)

*Primary Examiner* — Hanh Phan
(74) *Attorney, Agent, or Firm* — Conley Rose, P.C.; Grant Rodolph; John Scott

(57) ABSTRACT

An apparatus comprising an optical transmitter, a coarse tuner coupled to the optical transmitter and having a first tuning range, a fine tuner coupled to the optical transmitter and having a second tuning range smaller than and within the first tuning range, a wavelength division demultiplexer coupled to the optical transmitter and to a plurality of optical fibers, and a detector coupled to the optical transmitter and the wavelength division demultiplexer. A network component comprising at least one processor configured to implement a method comprising detecting an Optical Time Domain Reflectometry (OTDR) signal spectrum that has a modulated pattern, and detecting a reflected OTDR signal spectrum that has a shifted modulated pattern comprising a frequency shift with respect to the OTDR signal spectrum and a time shift proportional to the frequency shift.

20 Claims, 5 Drawing Sheets

(56) References Cited

OTHER PUBLICATIONS

Foreign Communication From a Related Counterpart Application, PCT Application PCT/CN2010/077909, Written Opinion dated Jan. 27, 2011, 8 pages.

Araki, Noriyuki et al., "Reduction of Optical Fiber Maintenance Cost by Using Automatic Optical Fiber Operations Support System with Remote Fiber Selector," IEICE Transactions on Electronics, vol. E85-C, No. 4, published Apr. 1, 2002, pp. 915-920.

Chen, W. et al., "Embedded OTDR Monitoring of the Fiber Plant Behind the PON Power Splitter," Proceedings Symposium IEEE/LEOS Benelux Chapter, 2006, Eindhoven, pp. 13-16.

"Series G: Transmission Systems and Media, Digital Systems and Networks—Transmision Media and Optical Systems Characteristics—Characteristics of Optical Systems—Spectral Grids for WDM Applications: DWDM Frequency Grid," ITU-T G.694.1, Feb. 2012, 16 pages.

"Series G: Transmission Systems and Media, Digital Systems and Networks—Transmission Media Characteristics—Characteristics of Optical Components and Subsystems—Spectral Grids for WDM Applications: CWDM Wavelength Grid," ITU-T G.694.2, Dec. 2003, 12 pages.

"Series G: Transmission Systems and Media, Digital Systems and Networks—Digital Sections and Digital Line System—Optical Line Systems for Local and Access Networks—ONT Management and Control Interface Specification for B-PON," ITU-T G.983.2, Jul. 2005, 370 pages.

"Series G: Transmission Systems and Media, Digital Systems and Networks—Digital Sections and Digital Line System—Optical Line Systems for Local and Access Networks—ONT Management and Control Interface Specification for B-PON—Amendment 1: Omnibus Improvements for OMCI," ITU-T G.983.2, Mar. 2006, 198 pages.

"Series G: Transmission Systems and Media, Digital Systems and Neworks—Digital Sections and Digital Line System—Optical Line Systems for Local and Access Networks—ONT Management and Control Interface Specification for B-PON," Erratum 1, ITU-T G.983.2, Jun. 1, 2006, 1 page.

"Series G: Transmission Systems and Media, Digital Systems and Networks—Digital Sections and Digital Line System—Optical Line Systems for Local and Access Networks—ONT Management and Control Interface Specification for B-PON—Amendment 2," ITU-T G.983.2, Jan. 2007, 64 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): General Characteristics," ITU-T G.984.1, Mar. 2008, 43 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): General Characteristics—Amendment 1," ITU-T G.984.1, Oct. 2009, 8 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): Physical Media Dependent (PMD) Layer Specification," ITU-T G.984.2, Mar. 2003, 38 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): Physical Media Dependent (PMD) Layer Specification—Amendment 1: New Appendix III—Industry Best Practice for 2.488 Gbits/downstream, 1.244 Gbits/upstream G-PON," ITU-T G.984.2, Feb. 2006, 12 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): Physical Media Dependent (PMD) Layer Specification—Amendment 2," ITU-T G.984.2, Mar. 2008, 16 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): Transmission Convergence Layer Specification," ITU-T G.984.3, Mar. 2008, 146 pages.

"Series G: Transmission and Media, Digital Systems and Networks—Digital Sections and Digital Line System—Optical Line Systems for Local and Access Networks—Digital Sections and Digital Line System—Optical Line Systems for Local Access Networks—Gigabit-Capable Passive Optical Networks (GPON): Transmission Convergence Layer Specification—Amendment 1—Specification of the ONU Registration Method and Various Clarifications," ITU-T G.984.3, Feb. 2009, 16 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): Transmission Convergence Layer Specification—Amendment 2: Time-of-Day Distribution and Maintenance Updates and Clarifications," ITU-T G.984.3, Nov. 2009, 18 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): ONT Management and Control Interface Specification," ITU-T G.984.4, Feb. 2008, 430 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): ONT Management and Control Interface Specification—Amendment 1," ITU-T G.984.4, Jun. 2009, 92 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): ONT Management and Control Interface Specification," Erratum 1, ITU-T G.984.4, Aug. 12, 2009, 2 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): ONT Management and Control Interface Specification—Amendment 2: Changes and Extensions to the OMCI, Editorial Clarifications and Corrections," ITU-T G.984.4, Nov. 2009, 164 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Networks—Gigabit-Capable Passive Optical Networks (GPON): ONT Management and Control Interface Specification—Corrigendum 1," ITU-T G.984.4, Mar. 2010, 8 pages.

"Series G: Transmission Systems and Media, Digital Systems and Networks—Digital Sections and Digital Line System—Optical Line Systems for Local and Access Networks—Digital Sections and Digital Line System—Optical Line Systems for Local and Access Net-

(56) References Cited

OTHER PUBLICATIONS works—Gigabit-Capable Passive Optical Networks (GPON): ONT Management and Control Interface Specification—Amendment 3: Clarification of Scope of Application," ITU-T G.984.4, Jul. 2010, 10 pages.

"Part 3: Carrier Sense Multiple Access with Collision Detection (CSMA/CD) Access Method and Physical Layer Specifications," IEEE Standard for Information Technology—Telecommunications and Information Exchange between systems—Local and Metropolitan Area Networks—Specific Requirements, IEEE Std 802.3™—2008, Dec. 26, 2008, 671 pages.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, Section 2, IEEE Std 802.3™—2008, Dec. 26, 2008, 790 pages.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, Section 3, IEEE Std 802.3™—2008, Dec. 26, 2008, 315 pages.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, Section 4, IEEE Std 802.3™—2008, Dec. 26, 2008, 586 pages.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, Section 5, IEEE Std 802.3™—2008, Dec. 26, 2008, 615 pages.

Office Action dated Aug. 15, 2013, 17 pages, U.S. Appl. No. 13/653,579, filed Oct. 17, 2012.

\* cited by examiner

TUNABLE COHERENT OPTICAL TIME DIVISION REFLECTOMETRY

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable.

BACKGROUND

Optical access systems, such as Passive Optical Networks (PONs) or other fiber optics networks, are continuously growing and optical fibers are being increasingly deployed. The increase in the quantity of deployed fibers can cause complications and communication problems in the systems, and therefore requires reliable diagnostic tools and equipment. One technique that is used to detect physical problems in the fibers is Optical Time Domain Reflectometry (OTDR). In OTDR, a test signal comprising a light pulse is transmitted down the fiber, reflected at some point, and then measured using an OTDR receiver located at the same location where the pulse has originated. The delay time between transmission and reception of the pulse is used to calculate the round-trip distance of the pulse. The calculated round-trip distance is used to find the location of any deteriorations or breaks in the fiber, which may then be fixed or replaced.

Generally, a conventional OTDR device is manually connected to a fiber to be tested, e.g. when a fault occurs. However, in the case of large number of fibers in the system, manually testing the fibers may be labor intensive and prone to many test errors. Alternatively, a single OTDR system may be permanently installed at a central office and shared for a plurality of fibers using moving parts and optical switches, which reduces reliability and increases costs. More recently, embedded OTDR systems have been used to overcome some of the disadvantages of the conventional OTDR system. Specifically, OTDR systems have been embedded into the optical transmitters/receivers (or transceivers) of the communication system. The OTDR signal can then be superimposed on an optical signal using the same transmitter, e.g. as a superimposed sinusoidal signal or specified data pattern. By using the same transmitter, the embedded OTDR systems may save some cost but may also add design complexities to the transmitters and other components. Specifically, the embedded OTDR schemes require specialized receivers to isolate and separately detect the reflected OTDR signals from the transported optical signals in the system. As such, the overall cost in the system may increase. In some schemes, the cost is reduced by using low cost OTDR receivers at the expense of reducing OTDR signal quality and hence testing capability.

SUMMARY

In one embodiment, the disclosure includes an apparatus comprising an optical transmitter, a coarse tuner coupled to the optical transmitter and having a first tuning range, a fine tuner coupled to the optical transmitter and having a second tuning range smaller than and within the first tuning range, a wavelength division demultiplexer coupled to the optical transmitter and to a plurality of optical fibers, and a detector coupled to the optical transmitter and the wavelength division demultiplexer.

In another embodiment, the disclosure includes a network component comprising at least one processor configured to implement a method comprising detecting an OTDR signal spectrum that has a modulated pattern, and detecting a reflected OTDR signal spectrum that has a shifted modulated pattern comprising a frequency shift with respect to the OTDR signal spectrum and a time shift proportional to the frequency shift.

In yet another embodiment, the disclosure includes a method comprising identifying a fiber to be tested using an OTDR signal, determining the wavelength associated with the fiber to be tested, transmitting the OTDR signal at the wavelength associated with the fiber, and routing the OTDR signal to the fiber based on the wavelength.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an OTDR system and method that may be used to detect faults in an optical fiber communication system. The optical fiber system may be any optical communication system that uses fibers to transport the optical signals between different terminals or components. The OTDR system may comprise a tunable optical transmitter that may be used for transmitting an OTDR signal and a demultiplexer that may be used to route the OTDR signal to one of a plurality of fibers. The OTDR system may also comprise at least one coherent detector that may be used to detect spectra of the transmitted OTDR signal and a reflected OTDR signal to obtain time delay information about the OTDR signals in the fibers. The time delay information may then be used to identify the location of any problems in the fibers. Using the same tunable optical transmitter and demultiplexer to test the different fibers may reduce the system cost. Additionally, using the coherent detector to detect the spectrum of the OTDR signal may increase the sensitivity of the OTDR scheme and thus the capability to identify problems in the fiber. Since the OTDR system may add limited cost to the communication system, the OTDR system's sensitivity may be improved at an acceptable cost.

The OTDR system may be used for a plurality of optical fiber communication systems, such as Synchronous Optical Networking (SONET)/Synchronous Digital Hierarchy (SDH) networks, wavelength switched optical networks (WSONs), Wavelength Division Multiplexing (WDM) networks, optical Ethernet networks, and PONs. A PON is one system for providing network access over "the last mile." The PON is a point-to-multipoint network comprised of an optical line terminal (OLT) at the central office, an optical distribution network (ODN), and a plurality of optical network terminals (ONTs) at the customer premises. Data is transmitted in the PON over optical fibers that connect the different PON components. When the physical conditions of the optical fibers deteriorate, the transmission of data is affected. For instance, breaks or partial breaks in the optical fibers can lead to a reduction in data transmission bandwidth, extensive traffic congestion, or a complete stop of data transmission.

Figure 1:
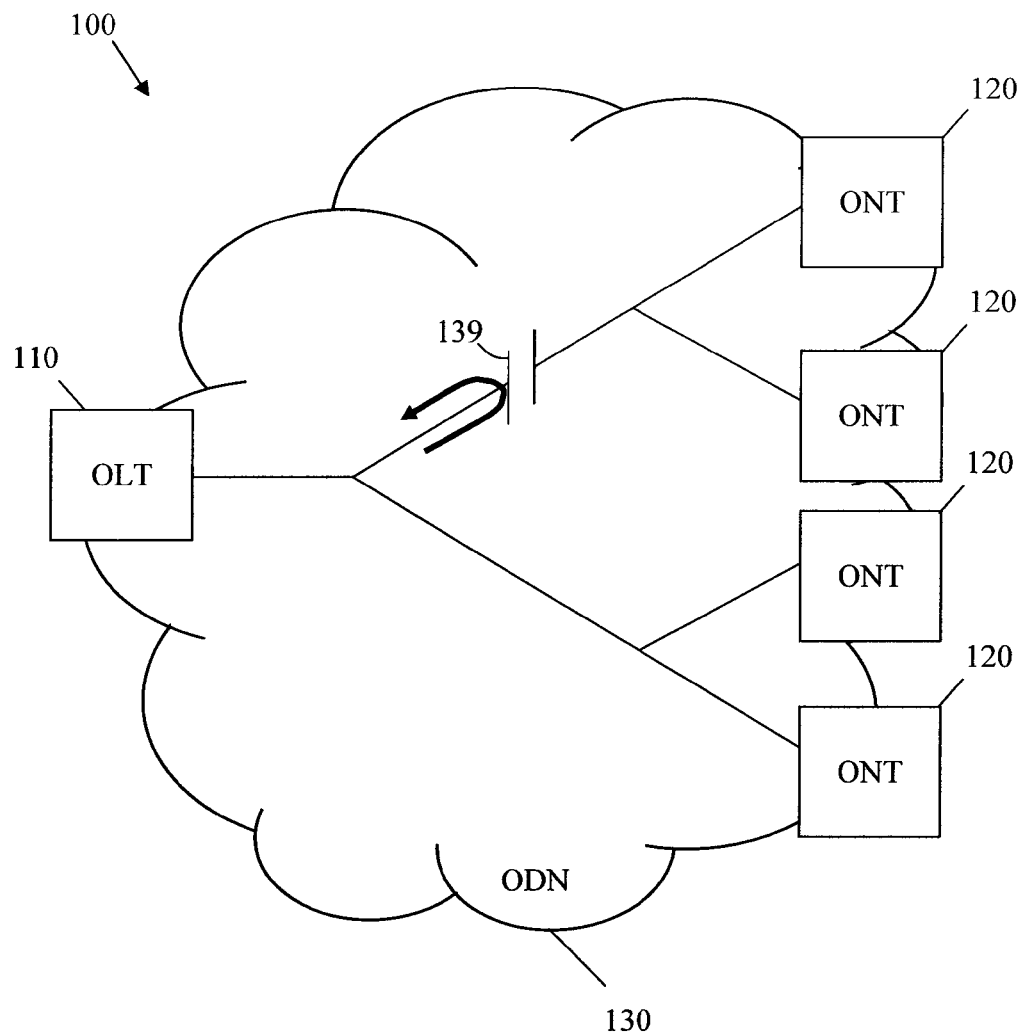
FIG. 1 is a schematic diagram of an embodiment of a PON.

FIG. 1 illustrates one embodiment of a PON 100. The PON 100 comprises an OLT 110, a plurality of ONTs 120, and an ODN 130. The PON 100 is a communications network that does not require any active components to distribute data between the OLT 110 and the ONTs 120. Instead, the PON 100 uses the passive optical components in the ODN 130 to distribute data between the OLT 110 and the ONTs 120. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 110. The OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment the OLT 110 may comprise a transmitter and a receiver. When the other network is using a protocol, such as Ethernet or SONET/SDH, that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

Another component of the PON 100 may be the ONTs 120. The ONTs 120 may be any device that is configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment the ONTs 120 may comprise an optical transmitter configured to send optical signals to the OLT 110. Additionally, the ONTs 120 may comprise an optical receiver configured to receive optical signals from the OLT 110 and a converter that converts the optical signal into electrical signals for the customer, such as signals in the ATM or Ethernet protocol. The ONTs 120 may also comprise a second transmitter and/or receiver that may send and/or receive the electrical signals to a customer device. In some embodiments, ONTs 120 and optical network units (ONUs) are similar, and thus the terms are used interchangeably herein. The ONTs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONTs 120. The ODN 130 typically extends from the OLT 110 to the ONTs 120 in a branching configuration as shown in FIG. 1, but may be alternatively configured as determined by a person of ordinary skill in the art.

In an embodiment, an OTDR system (not shown) may be used to identify and locate any fault 139 that may occur between the OLT 110 and the ONTs 120 and may affect the communications between the OLT 110 and any of the ONTs 120. For instance, the fault 139 may occur in any of the components of the ODN 130, such as a deterioration or break in a fiber, a failure in a coupler or splitter, or both. The OTDR system may be coupled to the PON 100, such as to the ODN 130, a plurality of fibers in the ODN 130, the OLT 110, and/or any other components of the PON 100. The OTDR system may be used to monitor the connections between the OLT 110 and the ONTs 120 in a continuous manner or when a communication problem is detected. As such, an OTDR signal may be transmitted through the branch or fiber associated with the problem, and a corresponding reflected OTDR signal may be detected to locate the source of the problem and, in some cases, to determine the nature of the problem.

Figure 2:
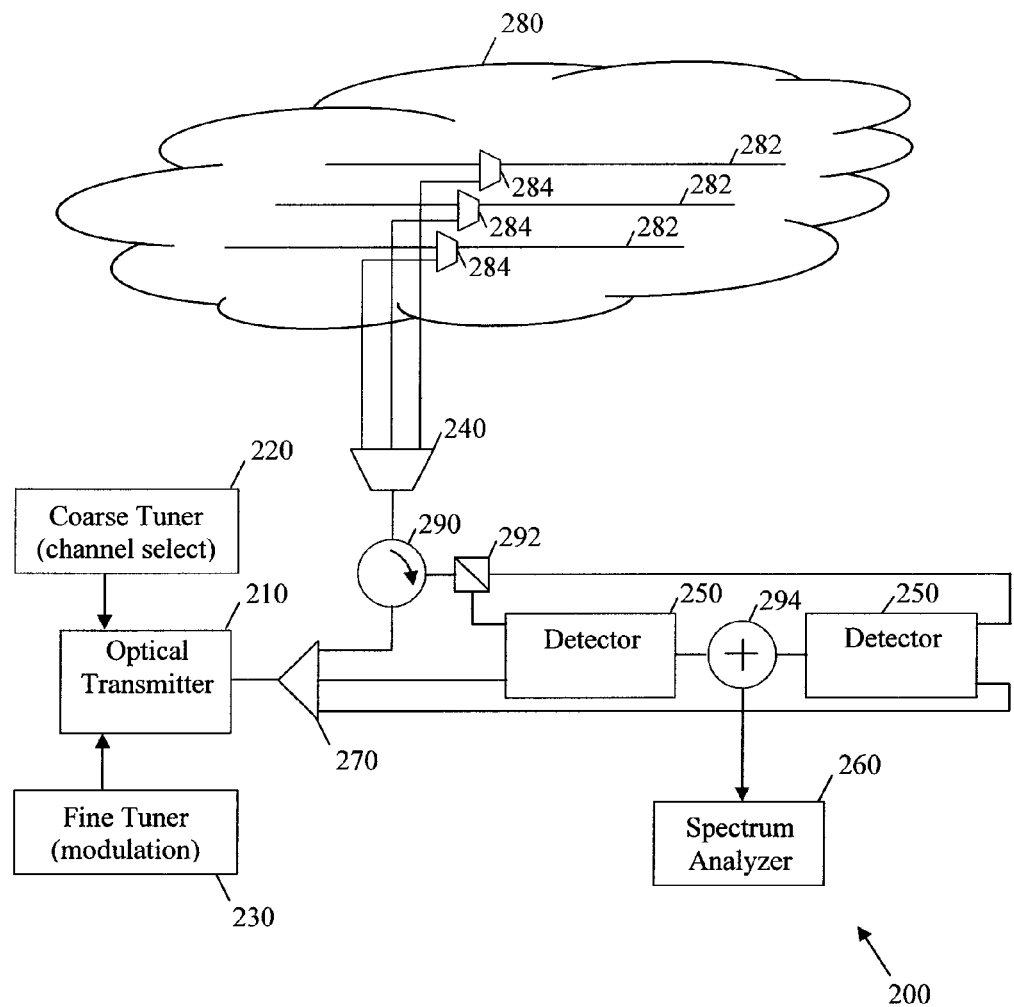
FIG. 2 is a schematic diagram of an embodiment of an OTDR apparatus.

FIG. 2 illustrates an embodiment of an OTDR apparatus 200. The OTDR apparatus 200 may comprise a tunable optical transmitter 210, a coarse tuner 220, a fine tuner 230, a splitter 270, an optical circulator 290, a wavelength division demultiplexer 240, a polarizing beam splitter 292, two detectors 250, a coupler 294, and a spectrum analyzer 260 configured as shown in FIG. 2. The OTDR apparatus 200 may also comprise a plurality of filters 284 used to couple the wavelength division demultiplexer 240 to a plurality of optical fibers in at least one optical fiber communication network 280, e.g. the PON.

The optical transmitter 210 may be and device configured to emit an optical signal (e.g. an OTDR signal) across a range of optical wavelengths. In an embodiment, the tunable optical transmitter 210 may be a tunable wavelength laser, such as a semiconductor laser or gas laser. For example, the optical transmitter 210 may be a laser diode, a heterostructure laser, a quantum well laser, a quantum cascade laser, a distributed feedback (DFB) laser, or combinations thereof. The optical transmitter 210 may be controlled such that it emits its optical signal within a single wavelength channel associated with one of the optical fibers 282. The optical channels may be Dense WDM (DWDM) channels, as described in the International Telecommunication Union Telecommunication Standardization Sector (ITU-T) G.694.1, coarse WDM (CWDM) channels, as described in the ITU-T G.694.2, or any other optical channels. In embodiments, the wavelength of the optical signal may be varied in the near infrared range (e.g. from about 0.7 micrometers (μm) to about one μm) and/or in the short-wave infrared range (e.g. greater than or equal to about one μm). For example, when the optical signal carried in one of the fibers 282 has a wavelength equal to about 1,625 nanometers (nm), the wavelength of the OTDR signal from the optical transmitter 210 may be varied from about 1,618 nm (or about 195,300 Gigahertz (GHz)) to about 1,632 nm (or about 183,700 GHz). The OTDR signal from the optical transmitter 210 may be a coherent signal that has a substantially constant phase over sufficiently long time durations, e.g. with limited or substantially no interruptions in transmissions. In some embodiments, a single laser that emits a plurality of OTDR signals at a plurality of wavelength channels may be used in the OTDR apparatus 200. In an alternative embodiment, an array of single wavelength lasers may be used instead of the tunable wavelength laser 210 to transmit the OTDR signal at a plurality of different wavelengths.

The coarse tuner 220 may be any device configured to cause the optical transmitter 210 to transmit its optical signal within one of a plurality of wavelength channels. In an embodiment, the course tuner 220 may be a heat source that may be used to vary the output wavelength of the tunable optical transmitter 210 by changing the temperature of the tunable optical transmitter 210. For instance, the coarse tuner 220 may be a heater that may be controlled electrically, e.g. via a current, to increase/decrease the temperature of the tunable optical transmitter 210 and hence its output wavelength.

The fine tuner 230 may be any device configured to cause the optical transmitter 210 to modulate its optical signal within a single wavelength channel. For instance, the fine tuner 230 may be an electrical signal modulator configured to modulate the frequency of the output of the tunable optical transmitter 210 using a modulated current. In an embodiment, the fine tuner 230 may modulate the frequency of the tunable optical transmitter 210 to obtain a saw-tooth wave spectrum, as described in detail below.

The splitter 270 may be any device that separates an optical signal into a plurality of substantially identical optical signals. For example, the splitter 270 may be a 1:3 optical coupler. In an embodiment, the splitter 270 may direct the transmitted OTDR signal from the optical transmitter 210 to the optical circulator 290 and each detector 250.

The optical circulator 290 may be any device that routes optical signals between a plurality of devices. In an embodiment, the optical circulator 290 may route signals in a clockwise manner such that any signal received on a port is routed to the leftmost adjacent port. For example, the optical circulator 290 may direct optical signals from the splitter 270 to the wavelength division demultiplexer 240, from the wavelength division demultiplexer 240 to the polarizing beam splitter 292, and if needed, from the polarizing beam splitter 292 to the splitter 270.

The wavelength division demultiplexer 240 may be any device configured to combine, separate, and/or route an optical signal based on the signal's wavelength. For example, the wavelength division demultiplexer 240 may be an arrayed wavelength grating (AWG). As such, the wavelength division demultiplexer 240 may be configured to route each of a plurality of optical signals from the optical transmitter 210 to one of the corresponding fibers 282.

The optical fiber communication network 280 may be any optical network such as a SONET/SDH network, a WSON, a PON, or any other WDM network. As such, the optical fibers 282 may carry data or other optical signals along the optical fibers 282.

The filters 284 may be any device configured to combine, separate, and/or route an optical signal based on the signal's wavelength. For example, the filters 284 may be configured to combine optical signals from the wavelength division demultiplexer 240 with optical signals existing within the optical fibers 282 (e.g. from the left side of the optical fibers 282 in FIG. 2). Similarly, the filters 284 may be configured to separate optical signals from within the optical fibers 282 (e.g. from the right side of the optical fibers 282 in FIG. 2) based on their wavelength such that the data signals at one wavelength continue down the optical fiber 282 (e.g. to the left in FIG. 2) and the OTDR signals are separated and routed to the wavelength division demultiplexer 240.

The polarizing beam splitter 292 may be any device configured to split an optical signal into two orthogonally polarized optical signals. For example, the polarizing beam splitter 292 may be a Wollaston prism. The detectors 250 may be any devices configured to detect a signal from the optical transmitter 210 and/or the optical fibers 282, e.g. from the fault. For example, the detectors may comprise an optical receiver that performs an optical to electrical conversion. In an embodiment, the detectors 250 may detect the reflected OTDR signal at the two different polarization states, which may be orthogonal to one another. The detectors 250 may each produce an output that is combined in a coupler 294, such as an electric coupler.

The spectrum analyzer 260 may be any device, component, or processor configured to obtain the spectra of the OTDR and reflected OTDR signals from the two detectors 250. The spectrum analyzer 260 may use the spectra to obtain time delay information about the OTDR signals from any of the fibers 282. The time delay information may be used to identify the location and, in some cases, the nature of the problem in the fiber 282. The spectrum analyzer 260 may be implemented using hardware, software, or both to obtain and process the spectra of the OTDR signals, and hence identify the location of the problem in the fiber 282, e.g. the location of the fault 139.

The OTDR apparatus may be used to detect faults in the fibers and/or other optical components that may transport optical signals. For instance, the OTDR apparatus 200 may be coupled to the ONT, the ODN, or the OLT, or anywhere else in the PON. As such, the OTDR apparatus 200 may be used to transmit an OTDR signal (e.g. an optical test signal) through a fiber in the PON and receive a reflected OTDR signal, e.g. from the fault. In an embodiment, the tunable optical transmitter 210 and the wavelength division demultiplexer 240 may be used to associate different OTDR signal channels with different fibers 282 and hence allow the testing of the fibers 282 without using a plurality of transmitters or moving parts. Specifically, the OTDR signal may be transmitted from the tunable optical transmitter 210 at a selected wavelength, which may be determined by the coarse tuner 220. The transmitted OTDR signal may also be modulated using the fine tuner 230. As such, the overall cost of the OTDR apparatus 200 may be less than other conventional or embedded OTDR systems.

For instance, to examine a first fiber of the fibers 282, the OTDR signal may be transmitted at a first wavelength associated with first fiber. The OTDR signal wavelength may be tuned to the first wavelength via the coarse tuner 220. The OTDR signal may also be modulated via the fine tuner 230 based on a coherent detection scheme to improve the signal to noise ratio of the detected signals. The splitter 270 and the circulator 290 may direct the transmitted OTDR signal from the tunable optical transmitter 210 to the wavelength division demultiplexer 240. The splitter 270 may also direct a copy of the transmitted OTDR signal to each of the detectors 250. The wavelength division demultiplexer 240 may be configured to route the OTDR signal transmitted at the first wavelength to the first fiber, e.g. via a first egress port. Similarly, to examine a second fiber from the fibers 282, the OTDR signal may be transmitted at a second wavelength associated with the second fiber using the coarse tuner 220. The OTDR signal may also be modulated using the fine tuner 230 based on the same coherent detection scheme. The wavelength division demultiplexer 240 may then route the OTDR signal transmitted at the second wavelength to the second fiber, e.g. via a second egress port.

The reflected OTDR signal may be reflected back from the first or second fiber of the fibers 282, through the filters 284, and to the wavelength division demultiplexer 240. The optical circulator 290 may then direct the reflected OTDR signal from the wavelength division demultiplexer 240 to the polarizing beam splitter 292 and thus prevent the reflected OTDR signal from reaching the tunable optical transmitter 210. The polarizing beam splitter 292 may split the reflected OTDR signal into two orthogonally polarized reflected OTDR signals and forward each of the two signals to one of the detectors 250. The two orthogonally polarized OTDR signals may then be combined and sent to the spectrum analyzer 260 via the electric coupler 294. The two orthogonally polarized OTDR signals may be combined to obtain an improved reflected OTDR signal that has a higher signal to noise ratio, e.g. that comprises fewer errors due to optical fiber dispersion. Additionally, the reflected OTDR signals may be combined with the OTDR signals forwarded from the tunable optical transmitter 210 (via the splitter 270) to increase the signal to noise ratio in the detected reflected OTDR signal. In an alternative embodiment, a single detector 250 may be used to detect the transmitted and reflected OTDR signals, for instance without using the polarizing beam splitter 292.

In an embodiment, the OTDR signal used to test the fiber, e.g. in the OTDR apparatus 200, may be described analytically. For instance, the electric field of the initially transmitted signal in the fiber, e.g. from the tunable optical transmitter 210, may be expressed as $E_L(t) = E_0 e^{j(\omega_0 + \alpha t)t}$, where $\omega_0$ is the angular frequency, $\alpha$ is a constant, and t indicates traveling time. At least a portion of the signal may then be reflected at a point in the fiber, e.g. the fault, after traveling a distance d. Thus, the reflected signal may have a time delay T that may be equal to about nd/c with respect to the transmitted signal, where n is the refractive index of the fiber and c is the speed of light. The electric field of the reflected signal may be expressed as $E_R(t) = E_1 e^{j(\omega_0 \alpha (t-T))t}$.

Based on the coherent detection scheme, the reflected signal from the fiber $E_R(t)$ may be combined with the initially transmitted signal $E_L(t)$. The detected combined signal may be expressed as $S(t) = (E_L + E_R)(E_L + E_R)^*$, where * indicates the complex conjugate. By substituting the expressions of $E_L$ and $E_R$ into S(t), the detected combined signal may be expressed as $S(t) = E_0^2 + E_1^2 + E_0 E_1 \cos(\omega_0 T + 2\alpha T t)$. The detected combined signal may comprise three components, a term representing the power or intensity of the initially transmitted signal, a term representing the intensity of the reflected signal, and a cosine term representing a mixed transmitted and reflected signal. The cosine term may have a field amplitude proportional to the intensity of the reflected signal and a frequency proportional to the time delay T and hence the distance d traveled in the fiber.

In some cases, the fiber may comprise a plurality of reflecting points in the fiber, e.g. a plurality of faults in the fiber, which may result in a plurality of reflected portions of the signal. The detected reflected signals may have different frequency components when combined with the initially transmitted signal. Additionally, the detected reflected signals may be mixed with each other and thus produce additional frequencies, which may be artificial or spurious. However, since the intensity of the initially transmitted signal may be substantially greater than the intensity of the reflected signals, the detected mixed signals having the additional frequencies may be negligible.

In an embodiment, the fine tuner 230 may be configured based on the coherent detection scheme to modulate the OTDR signal in a modulation pattern, which may have a saw-tooth wave spectrum. Such modulation pattern may allow the reception of the reflected OTDR signal without substantially interrupting the transmission of the OTDR signal, as described below. Since the transmitted OTDR signal may not be substantially interrupted over a time period, the amount of detected signal power during that period may be increased, which may increase the signal to noise ratio in the detected signal and improve detection sensitivity.

In other embodiments, the tunable optical transmitter 210 may be coupled to an increased number of fibers 282 in the same optical fiber communication network 280 or different networks using a plurality of demultiplexers 240. For instance, the tunable optical transmitter 210 may be coupled to a plurality of similar or different demultiplexers 240 via an optical switch (not shown), which may be positioned between the tunable optical transmitter 210 and the demultiplexers 240. For example, the optical switch may be a 1×8 switch that is coupled to about eight demultiplexers 240, which may be each a 1×32 demultiplexer that is coupled to about 32 fibers 282. As such, the tunable optical transmitter 210 may be coupled to a total of about 256 fibers 282.

Figure 3:
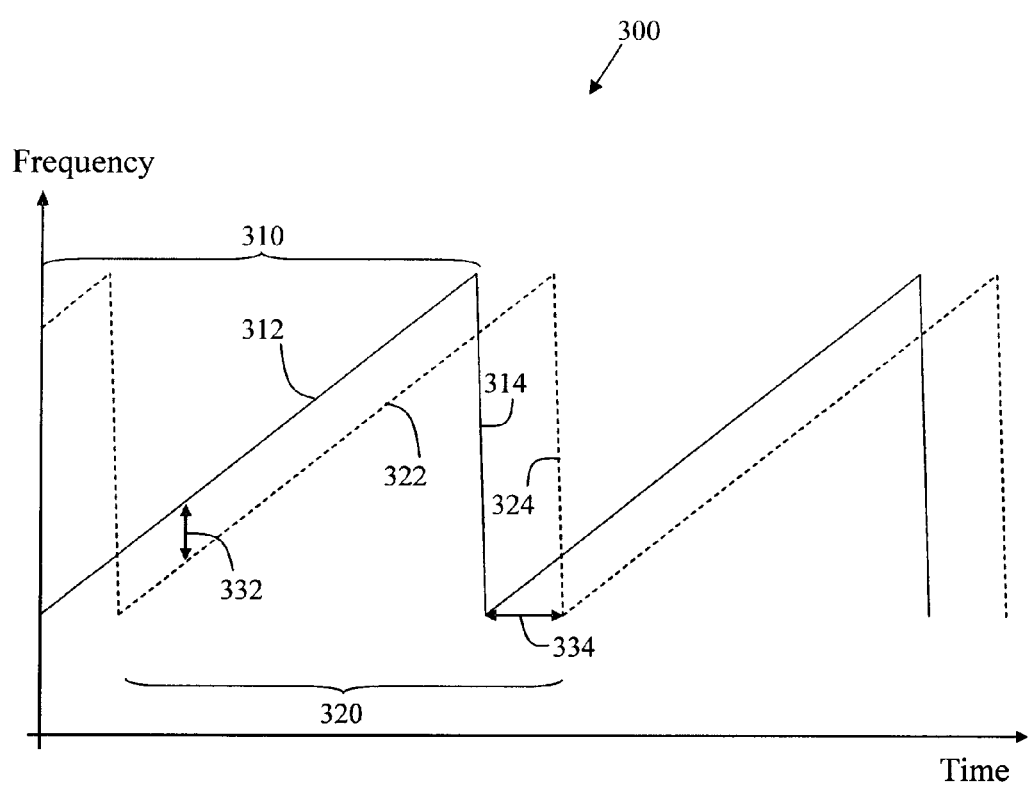
FIG. 3 is a graph of an embodiment of OTDR signal spectra.

FIG. 3 illustrates an embodiment of OTDR signal spectra 300, e.g. using the OTDR apparatus 200. For instance, the two-detectors 250 may be used to obtain the detected OTDR signals and the spectrum analyzer 260 may obtain the OTDR signal spectra 300 from the detected OTDR signals. The OTDR signal spectra 300 may comprise an OTDR signal spectrum 310 and a reflected OTDR signal spectrum 320. For instance, the OTDR signal spectrum 310 may correspond to the OTDR signal from the tunable optical transmitter 210, and the reflected OTDR signal spectrum 320 may correspond to a reflected OTDR signal from any of the fibers 282. In FIG. 3, the OTDR signal 310 is shown in solid line and the reflected OTDR signal 320 is shown in dashed line.

Specifically, the modulated OTDR signal from the transmitter may have a saw-tooth pattern and consequently the OTDR signal spectrum 310 that corresponds to the modulated OTDR signal may also have a saw-tooth pattern. The OTDR signal spectrum 310 may comprise a plurality of frequency rising portions 312 followed by a plurality of frequency dropping portions 314 over a detection time. The frequency rising portions 312 and the subsequent frequency dropping portions 314, may be repeated periodically over the detection time. The frequency rising portion 312 may increase substantially linearly (or any other shape) over the detection time and the frequency dropping portion 314 may drop substantially vertically (or any other shape) over the detection time in comparison to the frequency rising portion 312. The frequency rising portion 312 may also last substantially longer than the frequency dropping portion 314 over the detection time.

Similarly, the reflected OTDR signal spectrum 320 may have a saw-tooth pattern that comprises a plurality of frequency rising portions 322 followed by a plurality of frequency dropping portions 324 over the detection time. However, the reflected OTDR signal spectrum 320 may be shifted in frequency and time with respect to the OTDR signal spectrum 310. Specifically, there may be a frequency shift or offset 332 and a time shift or offset 334 between the frequency rising portion 322 and the frequency rising portion 312. The frequency offset 332 may be proportional to the time offset 334. However, this relationship may not be maintained in the case of the frequency dropping portion 324 and the frequency dropping portion 314, where the frequency shift or offset may be equal to about zero and may not be proportional to the time shift or offset.

The time offset 334 may also be referred to as the phase offset between the OTDR signal and the reflected OTDR signal and may indicate the time delay between the transmitted OTDR signal in the fiber and the reflected OTDR signal from the fiber. The time offset 334 may be proportional to the distance traveled by the signal to the reflection point in the fiber and thus may be used to obtain the location of the reflection point in the fiber, which may be a fault (e.g. the fault 139 shown in FIG. 1). Since the time offset 334 may be proportional to the frequency offset 332, the time offset 334 may be detected by obtaining the frequency offset 332 between the frequency rising portion 322 and the frequency rising portion 312 in the OTDR signal spectra 300. However, since the frequency offset may not be proportional to the time offset in the case of the frequency dropping portion 324 and the frequency dropping portion 314, the two frequency dropping portions may be blocked or masked off when processing the OTDR signal spectra 300 to obtain the time delay and the distance traveled in the fiber.

Modulating the OTDR signal (e.g. using the fine tuner 230) may allow the detection of the OTDR signal spectrum 310 and the reflected OTDR signal spectrum 320 over the same detection period to obtain the frequency offset 332 and hence the time offset 334. Accordingly, the OTDR signal may be transmitted (e.g. using the tunable wavelength source 210) in a continuous manner at about the same detection time with substantially no interruptions in transmissions. During that period, the transmitted and detected OTDR signals may be almost entirely processed (with the exception of the frequency dropping portion 324 and the frequency dropping portion 314) to determine the frequency offset 332, the time offset 334, and hence the distance traveled by the signal. As such, the saw-tooth modulation scheme may provide increased signal usage during testing time and consequently increased signal to noise ratio and improved detection sensitivity.

Since the reflected OTDR signal may be detected after traveling a longer distance in the fibers (e.g. from one of the fibers 282) than the transmitted OTDR signal (e.g. from the tunable optical transmitter 210), the detected intensity of the reflected OTDR signal spectrum 320 may be substantially less than the detected intensity of the OTDR signal spectrum 310. For example, the detected intensity of the reflected OTDR signal spectrum 320 may be equal to about 1/10,000 of the detected intensity of the OTDR signal spectrum 310. To increase the detected intensity of the reflected OTDR signal spectrum 320 to a level comparable to the detected intensity of the OTDR signal spectrum 310 (as shown in FIG. 3), the reflected OTDR signal may be combined with the transmitted OTDR signal at the detector(s) based on a coherent detection scheme.

In an embodiment, a coherent OTDR detection scheme may be used to map a roundtrip OTDR signal delay equal to about 200 microseconds (µs) into spectrum range equal to about one GHz. Additionally, the masked portion of the OTDR signal duration may be limited to about 20 percent of the overall signal time duration to improve sensitivity. Thus, the period of the saw-tooth pattern or wave of the OTDR signal spectrum may be equal to about one millisecond (ms) and the frequency range (e.g. peak to peak frequency) may be from about zero GHz to about five GHz. As such, the first portion of the saw-tooth wave that may be masked off may be equal to about 200 µs, during which the reflected OTDR signal from a previous period or cycle may arrive. Although, this frequency modulation that is used for transmitting the OTDR signal may be relatively low, the frequency modulation may have substantial detection sensitivity. For instance, the transmitter may be a laser operating in the continuous wave (CW) mode, where about 80 percent of its operation time may be used in the coherent OTDR detection scheme and only about 20 percent remaining time may not be used. Accordingly, a substantial amount of the laser power is used to improve the signal to noise ratio for OTDR signal detection.

Figure 4:
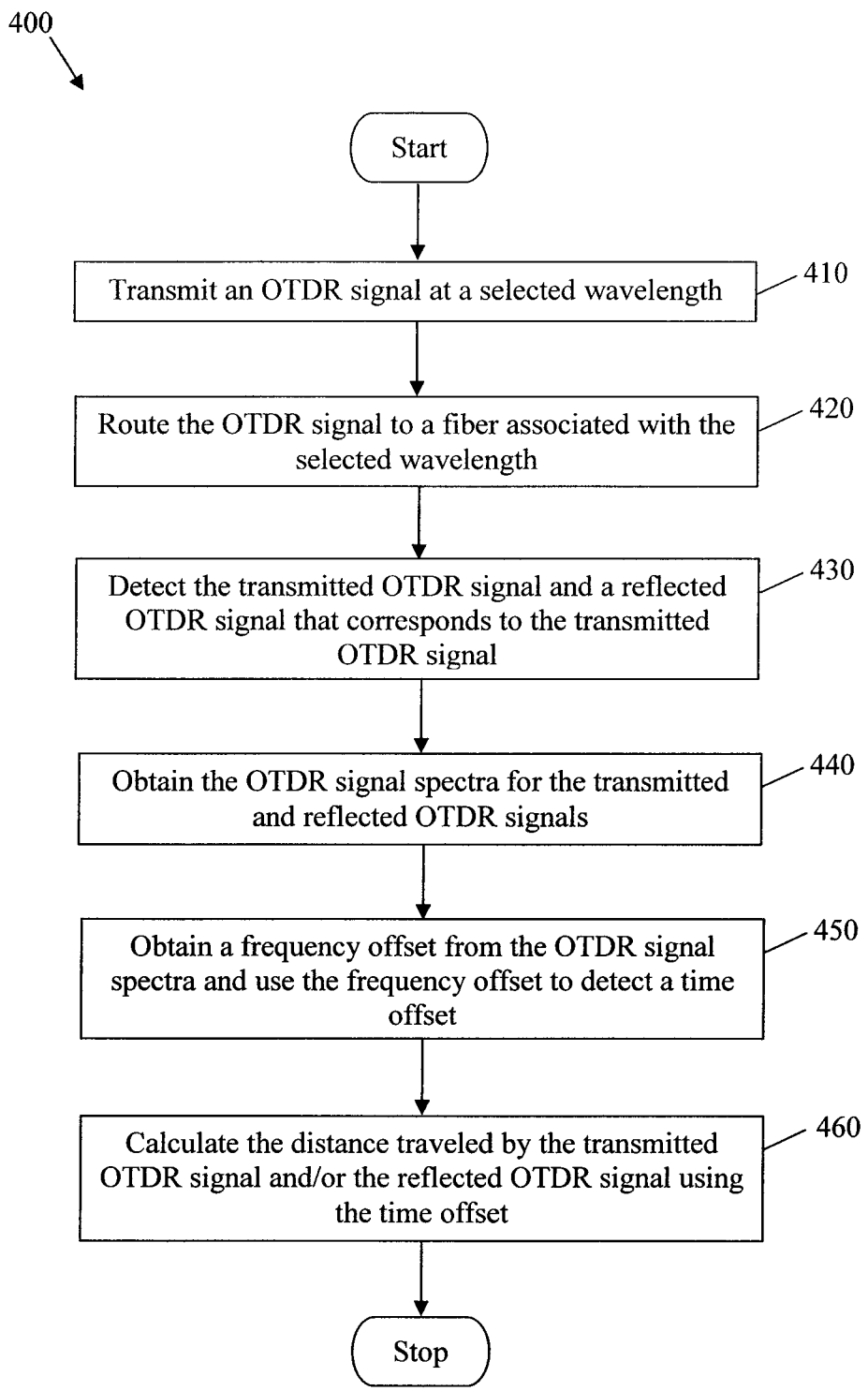
FIG. 4 is a flowchart of an embodiment of an OTDR signal detection method.

FIG. 4 illustrates an embodiment of an OTDR signal detection method 400 that may be used in a fiber optic communication network, such as the PON 100. The OTDR signal detection method 400 may be implemented using an OTDR system, such as the OTDR system 200. The OTDR signal detection method 400 may be based on a coherent OTDR detection scheme that detects and uses OTDR signal spectra, such as the OTDR signal spectra 300 to locate problems in the fibers. The OTDR signal detection method 400 may begin at block 410, where an OTDR signal may be transmitted at a selected wavelength. For instance, the OTDR signal may be transmitted using the tunable optical transmitter 210 and may have a frequency modulation corresponding to a saw-tooth frequency wave. The selected wavelength may be associated with one of the fibers in the network that needs to be monitored or where a communication problem may be detected. At block 420, the OTDR signal may be routed to the fiber associated with the selected wavelength. For instance, the OTDR signal may be switched using the wavelength division demultiplexer 240 to the fiber associated with the selected wavelength. Hence, the OTDR signal may propagate through the fiber and encounter a reflection point, e.g. a fault in the fiber, and hence a reflected OTDR signal may then propagate back through the fiber in the opposite direction.

At block 430, the transmitted OTDR signal and the reflected OTDR signal that corresponds to the transmitted OTDR signal may be detected, for instance using a coherent detector coupled to the transmitter, e.g. the two detectors 250. Specifically, the transmitted OTDR signal and the reflected OTDR signal may be detected in a continuous manner over a detection time. The two OTDR signals may comprise two overlapping waves, which may be shifted in time due to a phase delay between the transmitted signal and the reflected signal from the fiber. At block 440, the OTDR signal spectra may be obtained for the transmitted and reflected OTDR signals, which may also be overlapping and shifted in time. For instance, the spectrum analyzer 260 may be used to obtain the spectra of the transmitted and reflected OTDR signals that are detected by the coherent detector. At block 450, a frequency offset may be obtained from the OTDR signal spectra and then used to detect a time offset, which may be proportional to the frequency offset. At block 460, the distance traveled by the transmitted OTDR signal and/or the reflected OTDR signal may be calculated using the time offset, e.g. from the transmitter to the reflection point and/or from the reflection point to the detector. The calculated distance may then indicate the location of the reflection point, which may be a fault in the fiber that needs to be fixed.

Figure 5:
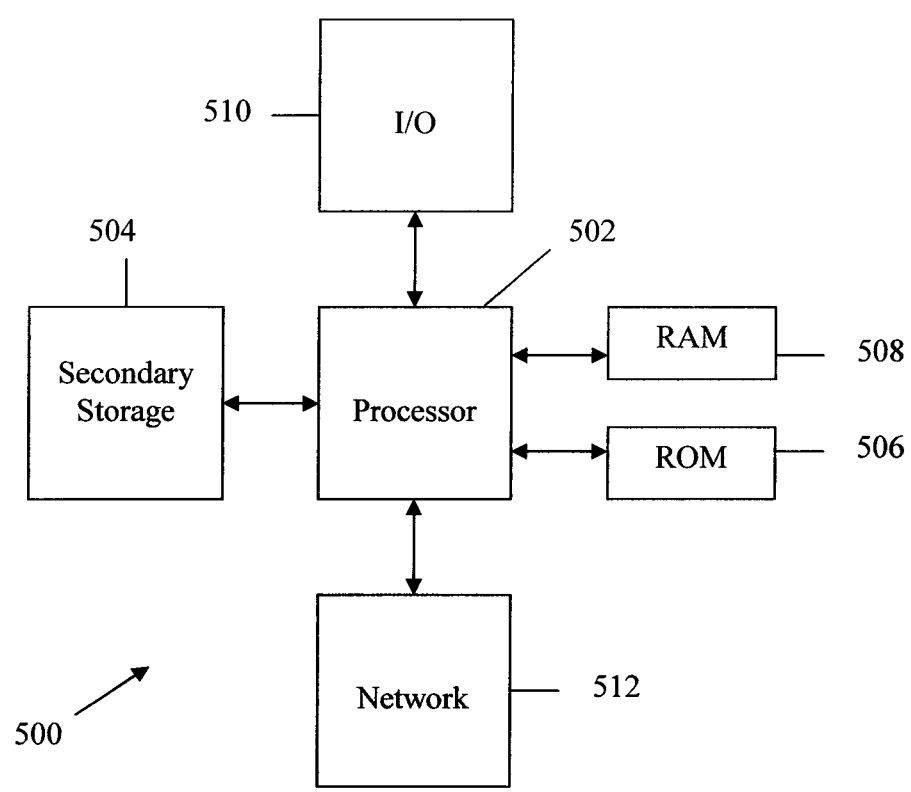
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor configured to:
   detect an Optical Time Domain Reflectometry (OTDR) signal spectrum that has a modulated pattern; and
   detect a reflected OTDR signal spectrum that has a shifted modulated pattern comprising a frequency shift with respect to the OTDR signal spectrum and a time shift proportional to the frequency shift.

2. The network component of claim 1, wherein each of the modulated pattern and shifted modulated pattern comprises a frequency rising portion followed by a frequency dropping portion.

3. The network component of claim 2, wherein the frequency rising portion increases substantially linearly over a detection time and the frequency dropping portion drops substantially vertically over the detection time, and wherein the frequency rising portion lasts substantially longer than the frequency dropping portion over the detection time.

4. The network component of claim 2, wherein the frequency rising portion lasts about 80 percent of the detection time and the frequency dropping portion lasts about 20 percent of the detection time.

5. The network component of claim 2, wherein the frequency rising portion of the shifted modulated pattern has the time shift proportional to the frequency shift in comparison to the frequency rising portion of the modulated pattern, and wherein the frequency dropping portion of the shifted modulated pattern does not have a time shift proportional to a frequency shift in comparison to the frequency dropping portion of a modulation saw-tooth pattern.

6. The network component of claim 1, wherein the detected OTDR signal spectrum is detected by detecting an OTDR signal that is initially transmitted in a substantially continuous manner during a time period, and wherein the OTDR signal spectrum and the reflected OTDR signal spectrum are substantially entirely detected during about the same time period.

7. The network component of claim 1, wherein the OTDR signal spectrum and the reflected OTDR signal spectrum are detected by detecting an OTDR signal and a reflected OTDR signal corresponding to the OTDR signal, and wherein the detected OTDR signal and reflected OTDR signal are combined to increase the detected intensity of the reflected OTDR signal spectrum to a level comparable to the detected intensity of the OTDR signal spectrum.

8. The network component of claim 1, wherein the reflected OTDR signal spectrum is detected by detecting two orthogonally polarized reflected OTDR signals, and wherein the two orthogonally polarized reflected OTDR signals are combined.

9. The network component of claim 1, wherein OTDR signal spectrum and the reflected OTDR signal spectrum travel along the same optical fiber.

10. A method of detecting faults in an optical fiber communication system comprising:
transmitting an Optical Time Domain Reflectometry (OTDR) signal spectrum that has a modulated pattern; and
detecting a reflected OTDR signal spectrum that has a shifted modulated pattern comprising a frequency shift with respect to the OTDR signal spectrum and a time shift proportional to the frequency shift.

11. The method of claim 10, wherein the OTDR signal spectrum and the reflected OTDR signal spectrum travel along the same optical fiber.

12. The method of claim 11, wherein each of the modulated pattern and shifted modulated pattern comprises a frequency rising portion followed by a frequency dropping portion.

13. The method of claim 12, wherein the frequency rising portion increases substantially linearly over a detection time and the frequency dropping portion drops substantially vertically over the detection time, and wherein the frequency rising portion lasts substantially longer than the frequency dropping portion over the detection time.

14. The method of claim 12, wherein the frequency rising portion lasts about 80 percent of the detection time and the frequency dropping portion lasts about 20 percent of the detection time.

15. The method of claim 12, wherein the frequency rising portion of the shifted modulated pattern has the time shift proportional to the frequency shift in comparison to the frequency rising portion of the modulated pattern, and wherein the frequency dropping portion of the shifted modulated pattern does not have a time shift proportional to a frequency shift in comparison to the frequency dropping portion of a modulation saw-tooth pattern.

16. The method of claim 11, wherein the detected OTDR signal spectrum is detected by detecting an OTDR signal that is initially transmitted in a substantially continuous manner during a time period, and wherein the OTDR signal spectrum and the reflected OTDR signal spectrum are substantially entirely detected during about the same time period.

17. A computer program product comprising computer executable instructions stored on a non-transitory medium that when executed by a processor cause the processor to:
detect an Optical Time Domain Reflectometry (OTDR) signal spectrum that has a modulated pattern; and
detect a reflected OTDR signal spectrum that has a shifted modulated pattern comprising a frequency shift with respect to the OTDR signal spectrum and a time shift proportional to the frequency shift.

18. The computer program product of claim 17, wherein each of the modulated pattern and shifted modulated pattern comprises a frequency rising portion followed by a frequency dropping portion.

19. The computer program product of claim 17, wherein a frequency rising portion increases substantially linearly over a detection time and a frequency dropping portion drops substantially vertically over the detection time, and wherein the frequency rising portion lasts substantially longer than the frequency dropping portion over the detection time.

20. The computer program product of claim 17, wherein the OTDR signal spectrum and the reflected OTDR signal spectrum travel along the same optical fiber.

* * * * *